United States Patent
Kashiwabara et al.

(10) Patent No.: US 10,868,450 B2
(45) Date of Patent: Dec. 15, 2020

(54) ROTOR OF ROTARY ELECTRIC MACHINE

(71) Applicant: HONDA MOTOR CO., LTD., Tokyo (JP)

(72) Inventors: Keiichiro Kashiwabara, Wako (JP); Atsushi Nishida, Wako (JP); Manabu Yazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 16/140,614

(22) Filed: Sep. 25, 2018

(65) Prior Publication Data
US 2019/0103775 A1 Apr. 4, 2019

(30) Foreign Application Priority Data
Oct. 4, 2017 (JP) .................. 2017-194548

(51) Int. Cl.
*H02K 1/27* (2006.01)
*H02K 1/32* (2006.01)
(Continued)

(52) U.S. Cl.
CPC ............ *H02K 1/276* (2013.01); *H02K 1/26* (2013.01); *H02K 1/2766* (2013.01); *H02K 15/03* (2013.01); *H02K 1/32* (2013.01); *H02K 9/19* (2013.01)

(58) Field of Classification Search
CPC ............ H02K 1/276; H02K 1/27; H02K 1/32; H02K 1/22; H02K 15/03; H02K 15/02
See application file for complete search history.

(56) References Cited

U.S. PATENT DOCUMENTS 1,370,156 A * 3/1921 Rudenberg ............... H02K 3/22
310/64
2,727,161 A * 12/1955 Kilner ...................... H02K 3/22
310/64
(Continued)

FOREIGN PATENT DOCUMENTS

JP  2009-303293  12/2009
JP  2011-091913  5/2011
(Continued)

OTHER PUBLICATIONS

Japanese Office Action for Japanese Patent Application No. 2017-194548 dated Mar. 26, 2019.
(Continued)

*Primary Examiner* — Edgardo San Martin
(74) *Attorney, Agent, or Firm* — Amin, Turocy & Watson, LLP (57) ABSTRACT

A rotor of a rotary electric machine includes a rotor core having a slot in an outer circumferential portion thereof, a permanent magnet inserted in the slot, and a resin injected into the slot to fix the permanent magnet in the slot, wherein an injection fixing space into which the resin is injected to fix the permanent magnet in the slot, and a non-injection space into which the resin is not injected are provided in a space within the slot, the non-injection space is disposed at a position adjacent to an outer side of the rotor core in a radial direction with respect to the injection fixing space, and an edge of the non-injection space includes a surface of the resin injected into the injection fixing space, and a first region on an inner surface of the slot which continues to the surface of the resin.

5 Claims, 4 Drawing Sheets

(51) Int. Cl.
*H02K 15/03* (2006.01)
*H02K 1/26* (2006.01)
*H02K 9/19* (2006.01)

(56) References Cited

U.S. PATENT DOCUMENTS

| | | | | |
|---|---|---|---|---|
| 3,488,532 A | * | 1/1970 | Anderson | H02K 3/24 |
| | | | | 310/58 |
| 3,624,432 A | * | 11/1971 | Merz | H02K 3/24 |
| | | | | 310/53 |
| 4,037,312 A | * | 7/1977 | Deis | H02K 3/12 |
| | | | | 29/598 |
| 6,879,069 B1 | * | 4/2005 | Weidman | H02K 1/32 |
| | | | | 310/54 |
| 7,061,148 B2 | * | 6/2006 | Philippart | H02K 3/24 |
| | | | | 310/58 |
| 7,714,479 B2 | * | 5/2010 | Seneff | H02K 1/2793 |
| | | | | 310/156.21 |
| 7,948,126 B2 | * | 5/2011 | Fulton | H02K 5/20 |
| | | | | 310/54 |
| 7,948,134 B2 | * | 5/2011 | Jockel | H02K 1/276 |
| | | | | 310/156.23 |
| 9,006,943 B2 | * | 4/2015 | Chamberlin | H02K 3/24 |
| | | | | 310/52 |
| 9,515,536 B2 | * | 12/2016 | Buttner | H02K 9/20 |
| 9,991,754 B2 | * | 6/2018 | Horii | H02K 1/30 |
| 10,116,178 B2 | * | 10/2018 | Horii | H02K 1/32 |
| 2019/0109525 A1 | * | 4/2019 | Gangi | H02K 1/276 |

FOREIGN PATENT DOCUMENTS

| | | | |
|---|---|---|---|
| JP | 2013-066345 | | 4/2013 |
| JP | 2013066345 A | * | 4/2013 |
| WO | 2011/045860 | | 4/2011 |
| WO | 2016/148294 | | 9/2016 |
| WO | 2017/064938 | | 4/2017 |
| WO | 2017/159348 | | 9/2017 |

OTHER PUBLICATIONS

Chinese Office Action for Chinese Patent Application No. 201811098639.2 dated Apr. 24, 2020.

* cited by examiner

ROTOR OF ROTARY ELECTRIC MACHINE

CROSS-REFERENCE TO RELATED APPLICATION

Priority is claimed on Japanese Patent Application No. 2017-194548, filed Oct. 4, 2017, the content of which is incorporated herein by reference.

BACKGROUND OF THE INVENTION

Field of the Invention

The present invention relates to a rotor of a rotary electric machine.

Description of Related Art

Conventionally, a rotor used in a rotary electric machine is configured by inserting a permanent magnet into a slot (insertion hole) formed in a rotor core and injecting a resin into the slot (for example, refer to Japanese Unexamined Patent Application, First Publication No. 2011-91913). In this type of rotor, the permanent magnet is fixed in the slot by the resin.

SUMMARY OF THE INVENTION

In a case in which the rotor is an inner rotor disposed inward with respect to a stator in a radial direction, the permanent magnet is disposed near an outer circumferential surface of the rotor core. Therefore, in the conventional rotor, when the rotor rotates and a centrifugal force acts on the permanent magnet, stress is concentrated on a local portion (local part of the rotor core) of the rotor core which extends from the slot of the rotor core to the outer circumferential surface, and the local portion may be deformed.

In order to alleviate the stress acting on the local portion of the rotor core, for example, it is conceivable to increase a thickness of the local portion of the rotor core, that is, to form the slot at a position away from the outer circumferential surface of the rotor core inward in the radial direction. However, in this case, the permanent magnet also moves away from the outer circumferential surface of the rotor core inward in the radial direction and performance of the rotor deteriorates, which is not preferable.

An aspect according to the present invention has been made in view of the above-described circumstances, and it is an object thereof to provide a rotor of a rotary electric machine capable of alleviating stress acting on a local portion of a rotor core while a permanent magnet is disposed close to an outer circumferential surface of the rotor core.

In order to solve such a problem and achieve the object, the present invention adopts the following aspects.

(1) According to one aspect of the present invention, there is provided a rotor of a rotary electric machine, including a rotor core having a slot in an outer circumferential portion thereof, a permanent magnet inserted into the slot, and a resin injected into the slot to fix the permanent magnet in the slot, wherein an injection fixing space into which the resin is injected to fix the permanent magnet in the slot, and a non-injection space into which the resin is not injected are provided in a space within the slot, the non-injection space is disposed at a position adjacent to an outer side of the rotor core in a radial direction with respect to the injection fixing space, and an edge of the non-injection space includes a surface of the resin injected into the injection fixing space, and a first region on an inner surface of the slot which continues to the surface of the resin.

(2) In the aspect (1), the edge of the non-injection space may further include a second region on the inner surface of the slot which faces the surface of the resin.

(3) In the aspect (1) or (2), the non-injection space may open at both ends of the rotor core in an axial direction and may be configured as a refrigerant flow path through which a refrigerant flows.

(4) According to one aspect of the present invention, there is provided a rotor of a rotary electric machine, including a rotor core having a slot in an outer circumferential portion thereof, a permanent magnet inserted into the slot, and a resin injected into the slot to fix the permanent magnet in the slot, wherein an injection fixing space into which the resin is injected to fix the permanent magnet in the slot and a non-injection space into which the resin is not injected are provided in a space within the slot, the non-injection space is configured by a cavity which is surrounded by the resin forming at least the injection fixing space and does not open to an outer side of the slot, and the cavity is located on an outer side of the rotor core in a radial direction from the permanent magnet.

(5) In the aspect (4), a plurality of cavities may be formed in the resin.

(6) In any one of the aspects (1) to (5), the resin may be formed by molding.

(7) In any one of the aspects (1) to (6), a convex portion which protrudes into the slot may be formed on the rotor core, and the convex portion may be disposed at a position adjacent to an outer side of the rotor core in the radial direction with respect to the permanent magnet disposed in the injection fixing space.

(8) In any one of the aspects (1) to (7), the permanent magnet and the non-injection space may be sequentially disposed in an inclined direction directed in a circumferential direction of the rotor core from an inner side of the rotor core toward an outer side thereof in the radial direction.

(9) In any one of the aspects (1) to (8), an arrangement space in which the permanent magnet is disposed and first and second gaps adjacent to both sides of the arrangement space may be provided in the space within the slot, the first gap may be located on the inner side of the rotor core in the radial direction from the second gap, and the non-injection space may be formed only in the second gap.

In the aspect (1), the non-injection space into which the resin is not injected is located between the permanent magnet and the resin disposed (in the injection fixing space) within the slot and a local portion of the rotor core from the slot of the rotor core to an outer circumferential surface thereof.

Therefore, even when a centrifugal force acts on the permanent magnet and the resin in the slot by rotation of the rotor, it is possible to minimize the centrifugal force acting on the local portion of the rotor core. Accordingly, even when the permanent magnet is disposed near the outer circumferential surface of the rotor core, stress acting on the local portion of the rotor core can be alleviated.

In the aspect (2), the resin is not in contact with (adhered to) the second region on the inner surface of the slot included in the local portion of the rotor core.

Therefore, it is possible to further reduce the centrifugal force acting on the local portion of the rotor core during the rotation of the rotor, as compared with a case in which the resin is in contact with the second region of the slot. That is, the stress acting on the local portion of the rotor core can be further alleviated.

In the aspect (3), it is possible to efficiently cool the rotor (in particular, the permanent magnet) by allowing a refrigerant to flow through the non-injection space of the slot.

In the aspect (4), when the centrifugal force acts on a portion of the permanent magnet and the resin disposed in the slot which is located on the inner side of the rotor core in the radial direction from the cavity during the rotation of the rotor, the cavity is contracted by the centrifugal force, and air in the cavity is compressed.

Accordingly, the centrifugal force can be absorbed in the cavity. Therefore, it is possible to minimize the centrifugal force acting on the local portion of the rotor core. That is, even when the permanent magnet is disposed near the outer circumferential surface of the rotor core, the stress acting on the local portion of the rotor core can be alleviated.

In the aspect (5), it is possible to absorb the above-described centrifugal force in a wider range, as compared with a case in which there is only one cavity.

In the aspect (6), since the resin is formed by molding, it is possible to stably form the resin into a desired shape.

In the aspect (7), the centrifugal force acting on the permanent magnet and the resin disposed in the injection fixing space within the slot can be received by the convex portion when the rotor rotates.

Accordingly, it is possible to further minimize the centrifugal force acting on the local portion of the rotor core and to further alleviate the stress acting on the local portion of the rotor core.

In the aspect (8), it is possible to arrange a plurality of permanent magnets inserted into a plurality of slots in a V shape and to configure a rotor having high performance in which one magnetic pole is configured by the plurality of permanent magnets.

In the aspect (9), since a formation region of the non-injection space is limited to only the second gap of the slot, it is possible to efficiently form the non-injection space at the time of manufacturing the rotor. Therefore, it is possible to easily manufacture the rotor.

DETAILED DESCRIPTION OF THE INVENTION

First Embodiment

Hereinafter, a first embodiment of the present invention will be described with reference to FIGS. 1 to 4

Figure 1:
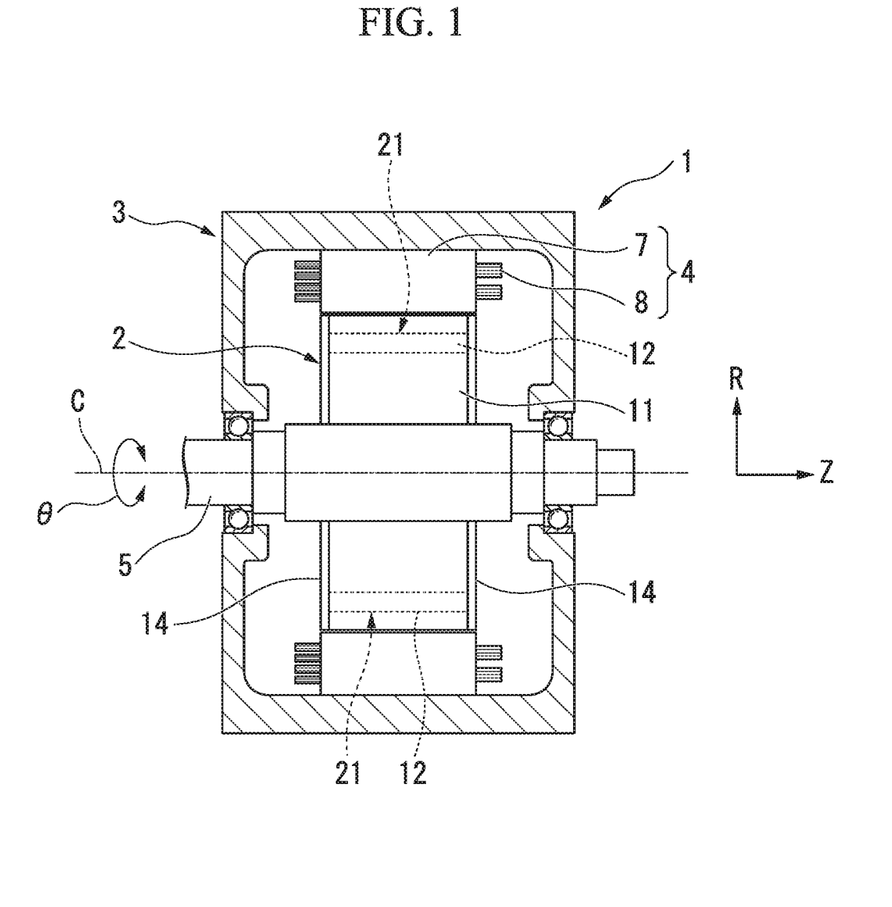
FIG. 1 is a cross-sectional view showing an overall constitution of a rotary electric machine including a rotor according to a first embodiment of the present invention.

As shown in FIG. 1, a rotor 2 according to the embodiment configures a rotary electric machine 1 together with a case 3, a stator 4, and a shaft 5. The rotary electric machine 1 is a running motor mounted in a vehicle such as a hybrid car or an electric car, for example. However, the constitution of the embodiment is not limited to the above-described example and can also be applied to motors for other uses such as a power generation motor mounted in a vehicle. In addition, the constitution of the embodiment is applicable to all rotary electric machines 1 including a generator in addition to those mounted in vehicles.

The case 3 is formed in a cylindrical shape which accommodates the stator 4 and the rotor 2.

The stator 4 is formed in an annular shape. The stator 4 is installed on an inner circumferential surface of the case 3. The stator 4 includes a stator core 7 and a winding 8 installed on the stator core 7. The stator 4 generates a magnetic field when a current flows through the winding 8.

Figure 2:
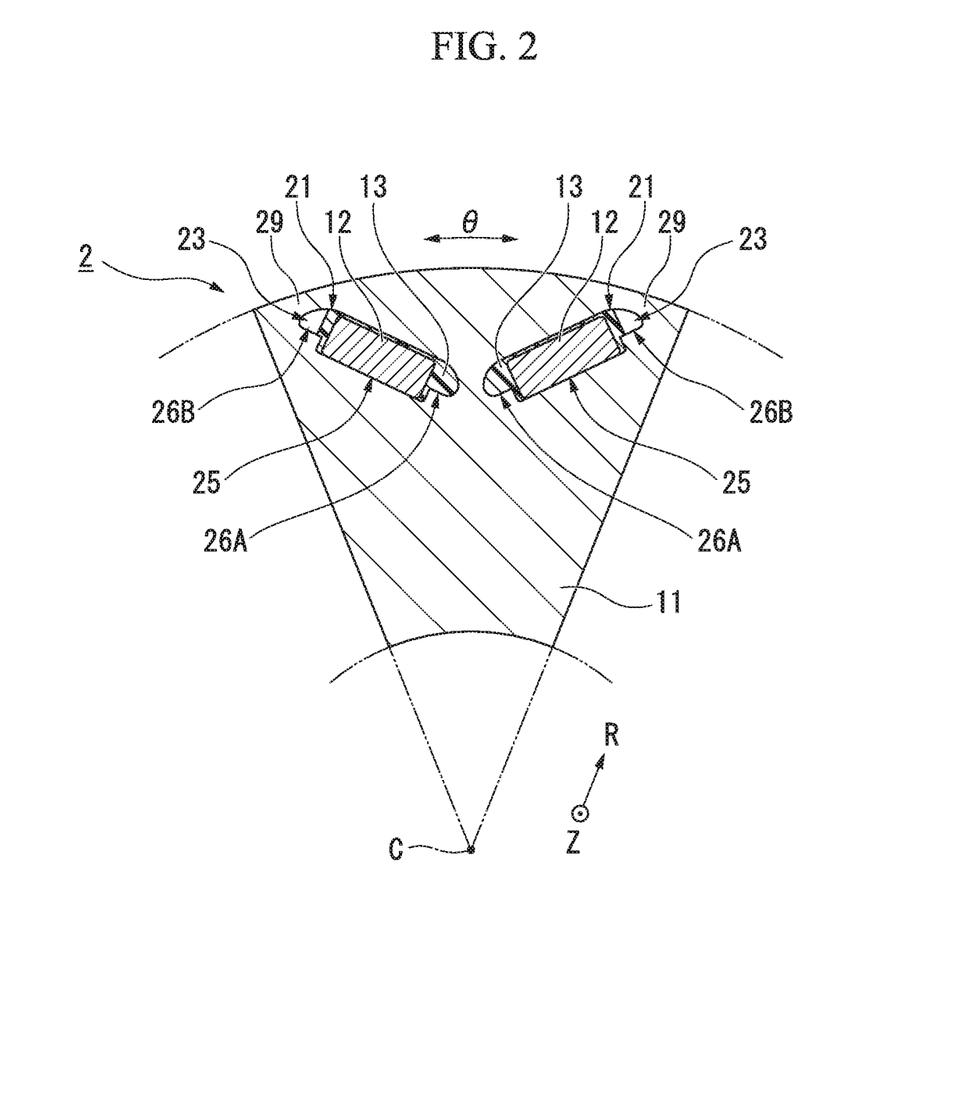
FIG. 2 is a cross-sectional view of part of the rotor according to the first embodiment in a circumferential direction when seen in an axial direction.

The rotor 2 is an inner rotor disposed inside the stator 4. The rotor 2 is formed in an annular shape. As shown in FIGS. 1 and 2, the rotor 2 is configured by installing a permanent magnet 12 in a rotor core 11. The rotor 2 is rotationally driven by the magnetic field generated in the stator 4 repelling or attracting the permanent magnet 12.

The shaft 5 is connected to the rotor 2 in a state in which it is inserted through the rotor 2 (rotor core 11). The shaft 5 outputs rotation of the rotor 2 as a driving force.

In the following description, an axial direction (Z direction) of the rotary electric machine 1 and the rotor 2 is a direction along a rotation axis C of the shaft 5. A radial direction (R direction) of the rotary electric machine 1 and the rotor 2 is a direction orthogonal to the rotation axis C. An inner side of the rotary electric machine 1 and the rotor 2 in the radial direction is a direction approaching the rotation axis C in the radial direction, and an outer side of the rotary electric machine 1 and the rotor 2 in the radial direction is a direction away from the rotation axis C in the radial direction. A circumferential direction (θ direction) of the rotary electric machine 1 and the rotor 2 is a direction rotating around the rotation axis C.

The rotor 2 includes the rotor core 11, the permanent magnet 12, and a resin 13. Further, the rotor 2 includes an end surface plate 14.

The rotor core 11 is formed of a magnetic material and is formed into an annular shape with the rotation axis C as a center.

The rotor core 11 of the embodiment is formed by stacking a plurality of electromagnetic steel plates in the axial direction.

The rotor core 11 has a slot 21 in an outer circumferential portion thereof. The slot 21 is a through-hole which passes through the rotor core 11 in the axial direction. A plurality of slots 21 are disposed at intervals in the circumferential direction of the rotor core 11.

The permanent magnet 12 is inserted into each of the slots 21. Further, the resin 13 is injected into each of the slots 21. The resin 13 is, for example, a thermosetting resin and fixes the permanent magnet 12 in the slot 21. The resin 13 may be formed, for example, by pouring a resin into the slot 21 without application of pressure, but in the embodiment, it is formed by molding in which the resin is injected into the slot 21 while pressure is applied. That is, the resin 13 of the embodiment is formed as molding resin.

Figure 3:
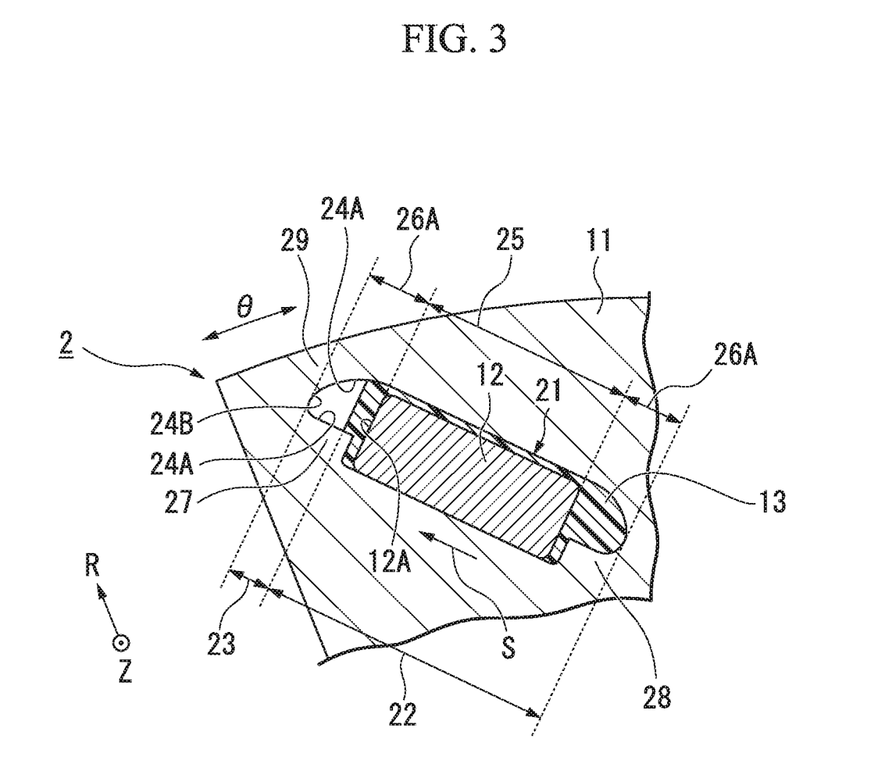
FIG. 3 is an enlarged cross-sectional view showing a main part of the rotor of FIG. 2.

As shown in FIGS. 2 and 3, in a space within each of the slots 21, there are an injection fixing space 22 in which the resin 13 is injected to fix the permanent magnet 12 in the slot 21 and a non-injection space 23 into which the resin 13 is not injected. The non-injection space 23 is disposed with respect to the injection fixing space 22 to be adjacent to an outer side of the rotor core 11 in the radial direction. An edge of the non-injection space 23 includes a surface of the resin 13 injected into the injection fixing space 22, and a first region 24A on an inner surface of the slot 21 connected to the surface of the resin 13. The first region 24A is located continuously on both sides (two places) of the surface of the resin 13 forming the edge of the non-injection space 23.

Hereinafter, the space in the slot 21 of the embodiment will be specifically described.

The space in the slot 21 of the embodiment includes an arrangement space 25 in which the permanent magnet 12 is disposed, and two gaps 26A and 26B (a first gap 26A and a second gap 26B) adjacent to both sides of the arrangement space 25. The two gaps 26A and 26B serve as a flux barrier which alleviates concentration of a magnetic flux generated by the permanent magnet 12 and minimizes magnetic short circuit. The first gap 26A is disposed in the outer side of the rotor core 11 relative to the second gap 26B in the radial direction.

The slots 21 of the embodiment are formed so that arranging directions of the arrangement space 25 and the two gaps 26A and 26B are inclined with respect to the radial direction of the rotor core 11. That is, the first gap 26A, the arrangement space 25, and the second gap 26B are disposed in that order in the circumferential direction of the rotor core 11 and disposed in that order toward the outer side of the rotor core 11 in the radial direction.

Further, in the embodiment, the arranging directions of the arrangement space 25 and the two gaps 26A and 26B are inclined in directions opposite to each other between the two slots 21 adjacent to each other in the circumferential direction of the rotor core 11. That is, two slots 21 adjacent to each other in the circumferential direction are disposed in a V shape. The number of permanent magnets which are arranged in a V shape and configure one magnetic pole is not limited to two and may be three or more, for example.

The injection fixing space 22 of the embodiment is configured by the first gap 26A and the arrangement space 25 described above. That is, the first gap 26A and the arrangement space 25 are filled with the permanent magnet 12 and the resin 13, and there is no cavity in the first gap 26A and the arrangement space 25. On the other hand, the non-injection space 23 is formed only in the second gap 26B. That is, in the second gap 26B, there is a cavity into which the resin 13 is not injected.

Based on this, in the embodiment, the injection fixing space 22 and the non-injection space 23 are sequentially disposed toward the outer side of the rotor core 11 in the radial direction and sequentially disposed in the circumferential direction of the rotor core 11. That is, the injection fixing space 22 (permanent magnet 12) and the non-injection space 23 are sequentially disposed in an inclining direction S directed in the circumferential direction of the rotor core 11 from the inner side of the rotor core 11 toward the outer side in the radial direction.

In the illustrated example, the resin 13 which fixes the permanent magnet 12 enters part of the second gap 26B. That is, although part of the second gap 26B is included in the injection fixing space 22, the present invention is not limited thereto.

Further, although the resin 13 is injected only into the injection fixing space 22 in the illustrated example, for example, the resin may be separately injected into a position in the non-injection space 23 separated from the injection fixing space 22.

In the constitution in which the resin 13 is injected only into the injection fixing space 22 as shown in the illustrated example, the edge of the non-injection space 23 is configured by the surface of the resin 13 injected into the injection fixing space 22 and facing the non-injection space 23 and the entire inner surface of the slot 21 connected to the surface of the resin 13. That is, the edge of the non-injection space 23 further includes a second region 24B on the inner surface of the slot 21 facing the surface of the resin 13 in addition to the surface of the resin 13 and the first region 24A on the inner surface of the slot 21.

On the other hand, in the constitution in which the resin is separately injected into the position in the non-injection space 23 separated from the injection fixing space 22, the edge of the non-injection space 23 is formed of, for example, a resin in contact with the surface of the resin 13 injected into the injection fixing space 22 and facing the non-injection space 23, the first region 24A on the inner surface of the slot 21, and the second region 24B on the inner surface of the slot 21.

The edge of the non-injection space 23 may include, for example, a surface of the permanent magnet 12 in addition to the surface of the resin 13 injected into the injection fixing space 22. That is, the permanent magnet 12 may be exposed to the non-injection space 23. In this case, an entire region (surface region 12A of the permanent magnet 12) of the surface of the permanent magnet 12 facing toward the non-injection space 23 may be exposed, or only part of the surface region 12A of the permanent magnet 12 may be exposed and the remaining part of the surface region 12A of the permanent magnet 12 may be covered with the resin 13.

In the embodiment, the edge of the non-injection space 23 does not include the surface (surface region 12A) of the permanent magnet 12. That is, the permanent magnet 12 is buried in the resin 13 and is not exposed to the non-injection space 23. In this case, for example, the surface of the permanent magnet 12 may be in contact with only the resin 13, but in the embodiment, it is also in contact with the inner surface of the slot 21 in addition to the resin 13. In the embodiment, the surface of the permanent magnet 12 is in contact with a region of the inner surface of the slot 21 located on an inner circumferential side of the rotor core 11 in the radial direction (region of the inner surface of the slot 21 facing outward in the radial direction).

A convex portion 27 (first convex portion 27) which protrudes into the slot 21 is formed on the rotor core 11 of the embodiment. The first convex portion 27 is disposed at a position adjacent to the outer side of the rotor core 11 in the radial direction with respect to the permanent magnet 12 disposed in the injection fixing space 22 (arrangement space 25). The first convex portion 27 may be located, for example, only in the non-injection space 23 or may be located to straddle the injection fixing space 22 and the non-injection space 23 as in the illustrated example.

In the slot 21 of the embodiment, as described above, the injection fixing space 22 and the non-injection space 23 are sequentially disposed in the inclining direction S directed in the circumferential direction of the rotor core 11 from the inner side of the rotor core 11 toward the outer side thereof in the radial direction. Therefore, the first convex portion 27 is disposed at a position adjacent to the permanent magnet 12 in the inclining direction S.

The first convex portion 27 protrudes from the inner surface of the slot 21 in a direction orthogonal to the inclining direction S (and the axial direction). For example, the first convex portion 27 may protrude from a region on the inner surface of the slot 21 located on the outer circumferential side of the rotor core 11 in the radial direction (the region facing the inner side of the inner surface of the slot 21 in the radial direction). In the embodiment, the first convex portion 27 protrudes from a region on the inner surface of the slot 21 located on the inner circumferential side of the rotor core 11 in the radial direction (the region facing the outer side of the inner surface of the slot 21 in the radial direction).

Further, the first convex portion 27 of the embodiment is formed so that a dimension of the second gap 26B in the direction orthogonal to the inclining direction S (and the axial direction) is smaller than a dimension of the arrangement space 25.

Further, a convex portion 28 (second convex portion 28) which protrudes into the slot 21 is formed separately from the above-described first convex portion 27 on the rotor core 11 of the embodiment. The second convex portion 28 is formed in the injection fixing space 22. The second convex portion 28 forms a corner portion for positioning the permanent magnet 12 in the slot 21 (in the injection fixing space 22) together with the inner surface of the slot 21.

In the slot 21 of the embodiment, the second convex portion 28 is disposed at a position in which the permanent magnet 12 is sandwiched between the second convex portion 28 and the first convex portion 27 in the inclining direction S.

Like the first convex portion 27, the second convex portion 28 protrudes from the inner surface of the slot 21 in the direction orthogonal to the inclining direction S (and the axial direction). For example, the second convex portion 28 may protrude from the region on the inner surface of the slot 21 located on the outer circumferential side of the rotor core 11 in the radial direction. Like the first convex portion 27, the second convex portion 28 of the embodiment protrudes from the region on the inner surface of the slot 21 located on the inner circumferential side of the rotor core 11 in the radial direction.

Further, like the first convex portion 27, the second convex portion 28 of the embodiment is formed so that a dimension of the first gap 26A in the direction orthogonal to the inclining direction S (and the axial direction) is smaller than the dimension of the arrangement space 25.

Like the above-described second convex portion 28, the first convex portion 27 of the embodiment forms a corner portion together with the inner surface of the slot 21. Therefore, like the second convex portion 28, the first convex portion 27 may serve to position the permanent magnet 12 in the slot 21.

As shown in FIG. 1, the end surface plate 14 of the rotor 2 is disposed to overlap each end surface of the rotor core 11 facing in the axial direction. The end surface plate 14 covers the slots 21 which open at the respective end surfaces of the rotor core 11. For example, the end surface plate 14 is formed of a non-magnetic material such as aluminum. A shape of the end surface plate 14 when seen in the axial direction corresponds to, for example, a shape of the end surface of the rotor core 11.

Figure 4:
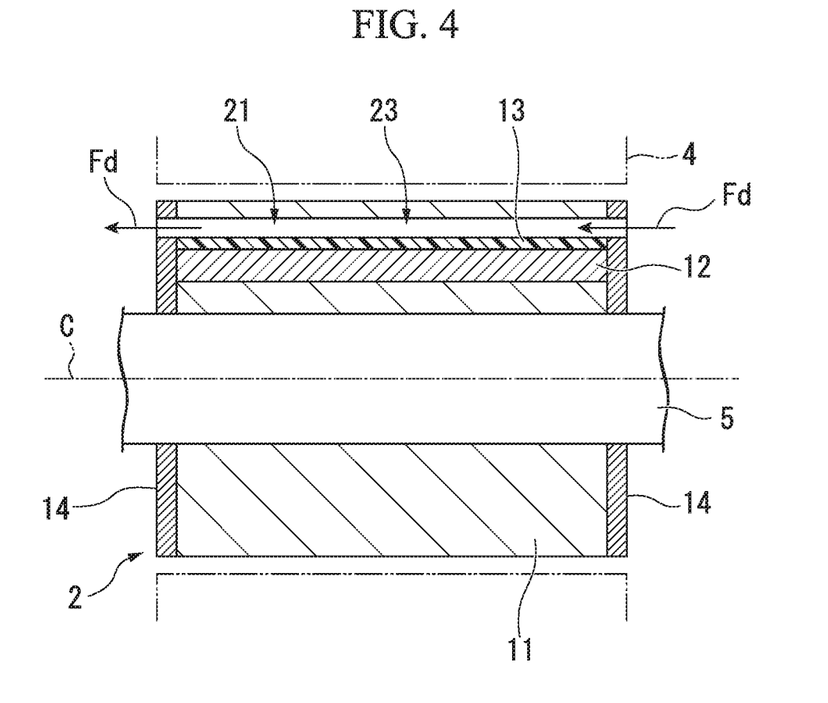
FIG. 4 is a cross-sectional view showing the rotor according to the first embodiment.

As shown in FIG. 4, the non-injection space 23 of the embodiment opens at both ends of the rotor core 11 in the axial direction. The non-injection space 23 is configured as a refrigerant flow path through which a refrigerant (for example, a cooling liquid) flows. Therefore, a through-hole is formed in the above-described end surface plate 14 to pass therethrough in a plate thickness direction (axial direction) of the end surface plate 14 and to communicate the non-injection space 23 with the outside. The through-hole of the end surface plate 14 forms the refrigerant flow path together with the non-injection space 23. An arrow Fd in FIG. 4 indicates a flow direction of the refrigerant in the refrigerant flow path.

As described above, according to the rotor 2 of the first embodiment, the non-injection space 23 into which the resin 13 is not injected is located between the permanent magnet 12 and the resin 13 disposed in the injection fixing space 22 inside the slot 21 and a local portion 29 (local portion 29 of the rotor core 11; refer to FIGS. 2 and 3) of the rotor core 11 extending from the slot 21 of the rotor core 11 to the outer circumferential surface thereof. Specifically, the first region 24A on the inner surface of the slot 21 is continued on both sides of the surface of the resin 13 forming the edge of the non-injection space 23. Therefore, the resin 13 is located away from the local portion 29 of the rotor core 11. Thus, even when a centrifugal force acts on the permanent magnet 12 and the resin 13 in the slot 21 by rotation of the rotor 2, it is possible to minimize the centrifugal force acting on the local portion 29 of the rotor core 11. Accordingly, even when the permanent magnet 12 is disposed near the outer circumferential surface of the rotor core 11, stress acting on the local portion 29 of the rotor core 11 can be alleviated.

Further, since the non-injection space 23 is present in the slot 21, a weight of the permanent magnet 12 and the resin 13 disposed in the slot 21 can be reduced as compared with a case in which the resin 13 is filled in the slot 21 without a gap. Therefore, it is possible to reduce the centrifugal force acting on the permanent magnet 12 and the resin 13 in the slot 21 during rotation of rotor 2. Accordingly, the stress acting on the local portion 29 of the rotor core 11 can be further alleviated.

Further, according to the rotor 2 of the first embodiment, the edge of the non-injection space 23 further includes the second region 24B on the inner surface of the slot 21 facing the surface of the resin 13, in addition to the surface of the resin 13 and the first region 24A on the inner surface of the slot 21. That is, the resin is not in contact with (adhered to) the second region 24B on the inner surface of the slot 21 included in the local portion 29 of the rotor core 11. Therefore, it is possible to further reduce the centrifugal force acting on the local portion 29 of the rotor core 11 during the rotation of the rotor 2, as compared with a case in which the resin is in contact with the second region 24B on the inner surface of the slot 21. That is, the stress acting on the local portion 29 of the rotor core 11 can be further alleviated.

Further, according to the rotor 2 of the first embodiment, the non-injection space 23 in the slot 21 is configured as the refrigerant flow path which opens at both ends of the rotor core 11 in the axial direction and through which the refrigerant flows. Therefore, it is possible to efficiently cool the rotor 2 (in particular, the permanent magnet 12) by allowing the refrigerant to flow through the non-injection space 23 of the slot 21.

Further, according to the rotor 2 of the first embodiment, the resin 13 is formed by the molding. Therefore, the resin 13 (in particular, the surface of the resin 13) can be more stably formed into a desired shape as compared with a case in which the resin 13 is simply poured into the slot 21.

Further, according to the rotor 2 of the first embodiment, the first convex portion 27 protruding into the slot 21 is disposed at a position adjacent to the outer side of the rotor core 11 in the radial direction with respect to the permanent magnet 12 disposed in the injection fixing space 22. Therefore, the centrifugal force acting on the permanent magnet 12 and the resin 13 disposed in the injection fixing space 22 inside the slot 21 during the rotation of the rotor 2 can be received by the first convex portion 27. Accordingly, it is possible to further minimize the centrifugal force acting on the local portion 29 of the rotor core 11 and to further alleviate the stress acting on the local portion 29 of the rotor core 11.

Further, according to the rotor 2 of the first embodiment, the injection fixing space 22 (the permanent magnet 12) and the non-injection space 23 are sequentially disposed in the inclining direction S directed in the circumferential direction of the rotor core 11 from the inner side of the rotor core 11 toward the outer side thereof in the radial direction. Therefore, it is possible to dispose two (or more) permanent magnets 12 inserted into two (plural) slots 21 in a V shape and to configure the rotor 2 having high performance in which one magnetic pole is formed by two (or more) permanent magnets 12.

Further, according to the rotor 2 of the first embodiment, since a formation region of the non-injection space 23 is limited only to the second gap 26B of the slot 21, the non-injection space 23 can be efficiently formed at the time of manufacturing the rotor 2. Therefore, it is possible to easily manufacture the rotor 2.

Further, according to the rotor 2 of the first embodiment, the resin 13 injected into the first convex portion 27 or the injection fixing space 22 is disposed at the position adjacent to the outer side of the rotor core 11 in the radial direction with respect to the permanent magnet 12. Therefore, the centrifugal force acting on the permanent magnet 12 disposed in the slot 21 during the rotation of the rotor 2 can be received by the first convex portion 27 or the resin 13 disposed at the position adjacent to the outer side of the rotor core 11 in the radial direction with respect to the permanent magnet 12. Thereby, it is possible to prevent the permanent magnet 12 from moving toward the outer side (non-injection space 23) of the rotor core 11 in the radial direction due to the centrifugal force. That is, it is possible to suitably prevent a position misalignment of the permanent magnet 12 in the slot 21.

Further, according to the rotor 2 of the first embodiment, the permanent magnet 12 is buried in the resin 13 injected into the injection fixing space 22 and is not exposed to the non-injection space 23. Therefore, the position misalignment of the permanent magnets 12 in the slots 21 can be more reliably prevented.

In the rotor 2 of the first embodiment, the non-injection space 23 may be formed as a cavity which does not open to the outer side of the slot 21, for example, by blocking an opening thereof by the end surface plate 14.

Second Embodiment

Next, a second embodiment of the present invention will be described with reference to FIG. 5. In the embodiment, the same reference numerals are given to the same elements as those in the first embodiment, and the description thereof will be omitted.

Figure 5:
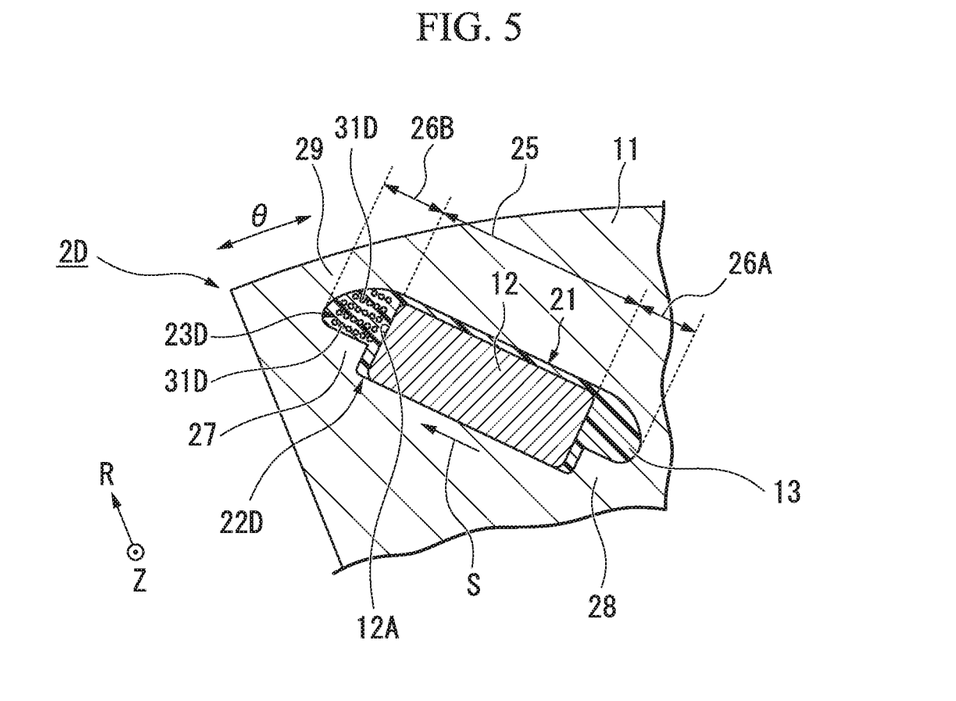
FIG. 5 is an enlarged cross-sectional view showing a main part of a rotor according to a second embodiment of the present invention.

A rotor 2D of the second embodiment shown in FIG. 5 may be provided in the same rotary electric machine 1 (refer to FIG. 1) as that in the first embodiment. Like the first embodiment, the rotor 2D of the embodiment includes the rotor core 11, the permanent magnet 12, and the resin 13.

Further, the same slot 21 as that in the first embodiment is formed in the rotor core 11 of the embodiment. Like the first embodiment, in the space in the slot 21, there is an injection fixing space 22D into which the resin 13 is injected to fix the permanent magnet 12 in the slot 21 and a non-injection space 23D in which the resin 13 is not injected.

However, the non-injection space 23D in the rotor 2D of the embodiment is configured by a cavity 31D which is surrounded by the resin 13 forming at least the injection fixing space 22D and does not open to the outer side of the slot 21. The cavity 31D is located on the outer side of the rotor core 11 in the radial direction with respect to the permanent magnet 12. The cavity 31D may be surrounded by only the resin 13 as the illustrated example, or may be surrounded by, for example, the resin 13 and the inner surface of the slot 21 or the surface of the permanent magnet 12.

For example, the cavity 31D formed in the resin 13 may be one, but in the embodiment, there are more than one. A portion of the resin 13 including a plurality of cavities 31D may be a porous body (porous). The plurality of cavities 31D may be spaced from each other at intervals as the illustrated example or may be connected to each other, for example.

Specifically, the injection fixating space 22D of the embodiment corresponds to the entire space within the slot 21 except the non-injection space 23D, that is, it is configured by the arrangement space 25 and both of the two gaps 26A and 26B. On the other hand, the cavity 31D (non-injection space 23D) is formed to be surrounded by the resin 13 injected into the second gap 26B located on the outer side of the rotor core 11 in the radial direction from the arrangement space 25.

The cavity 31D forming the injection fixing space 22D can be formed, for example, using a foamed resin as the resin 13. Further, the cavity 31D can be formed as a void, for example, by forcibly feeding air into the resin 13 when the resin 13 before curing is injected into the slot 21 or after it is injected.

The rotor 2D of the second embodiment has the same effects as those in the first embodiment.

Specifically, in the rotor 2D of the second embodiment, the non-injection space 23D is configured by the cavity 31D which does not open in the slot 21, and the cavity 31D is located on the outer side of the rotor core 11 in the radial direction with respect to the permanent magnet 12. Therefore, when the centrifugal force acts on a portion of the permanent magnet 12 or the resin 13 disposed in the slot 21 which is located on the inner side of the rotor core 11 in the radial direction from the cavity 31D during the rotation of the rotor 2D, the cavity 31D is contracted by the centrifugal force, and the air in the cavity 31D is compressed. Therefore, the above-described centrifugal force can be absorbed in the cavity 31D. Accordingly, it is possible to minimize the centrifugal force acting on the local portion 29 of the rotor core 11. That is, even when the permanent magnet 12 is disposed near the outer circumferential surface of the rotor core 11, the stress acting on the local portion 29 of the rotor core 11 can be alleviated.

Further, in the rotor 2D of the second embodiment, when a plurality of cavities 31D forming the non-injection space 23D are formed in the resin 13, it is possible to absorb the above-described centrifugal force in a wider range as compared with a case in which there is only one cavity 31D.

Although the details of the present invention have been described above, the present invention is not limited to the above-described embodiments, and various modifications can be made without departing from the spirit of the present invention.

For example, the present invention can also be applied to a rotor core having a slot formed so that an arrangement direction of the arrangement space of the slot and the two gaps is orthogonal to the radial direction of the rotor core. In the slot formed as described above, for example, at least a region of the arrangement space and the two gaps which is located on the inner side in the radial direction may be set as the injection fixing space, and at least part of a region of the arrangement space and the two gaps which is located on the outer side in the radial direction may be set as the non-injection space. Further, for example, the first convex portion which protrudes into the slot may protrude toward the inner side of the rotor core in the radial direction from a region of the inner surface of the slot corresponding to both ends of the arrangement space in the arrangement direction of the arrangement space and the two gaps.

What is claimed is:

1. A rotor of a rotary electric machine, comprising:
a rotor core having a slot in an outer circumferential portion thereof;
a permanent magnet inserted into the slot; and
a resin injected into the slot to fix the permanent magnet in the slot,
wherein an injection fixing space into which the resin is injected to fix the permanent magnet in the slot and a non-injection space into which the resin is not injected are provided in a space within the slot,
the non-injection space is configured by a plurality of cavities which are surrounded by the resin forming at least the injection fixing space and does not open to an outer side of the slot,
each of the plurality of cavities is located on an outer side of the rotor core in a radial direction from the permanent magnet, and
at least one of the plurality of cavities is surrounded by the resin and a region on an inner surface of the slot which is located on the outer side of the rotor core in the radial direction from the permanent magnet.

2. The rotor of the rotary electric machine according to claim 1, wherein the resin is formed by molding.

3. The rotor of the rotary electric machine according to claim 1, wherein a convex portion which protrudes into the slot is formed on the rotor core, and the convex portion is disposed at a position adjacent to an outer side of the rotor core in the radial direction with respect to the permanent magnet disposed in the injection fixing space.

4. The rotor of the rotary electric machine according to claim 1, wherein the permanent magnet and the non-injection space are sequentially disposed in an inclined direction directed in a circumferential direction of the rotor core from an inner side of the rotor core toward an outer side thereof in the radial direction.

5. The rotor of the rotary electric machine according to claim 1, wherein an arrangement space in which the permanent magnet is disposed and first and second gaps adjacent to both sides of the arrangement space are provided in the space within the slot, the first gap is located on the inner side of the rotor core in the radial direction from the second gap, and the non-injection space is formed only in the second gap.

* * * * *